US012810073B2

(12) United States Patent
Singhal et al.

(10) Patent No.: US 12,810,073 B2
(45) Date of Patent: Nov. 24, 2026

(54) ZERO SHOT DETECTION OF LLM GENERATED PHISHING EMAILS

(71) Applicant: Palo Alto Networks, Inc., Santa Clara, CA (US)

(72) Inventors: Ritika Singhal, San Jose, CA (US); Sujit Rokka Chhetri, San Jose, CA (US); Gaurav Mitesh Dalal, Fremont, CA (US); William Redington Hewlett, II, Mountain View, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 130 days.

(21) Appl. No.: 18/773,921

(22) Filed: Jul. 16, 2024

(65) Prior Publication Data

US 2026/0023926 A1 Jan. 22, 2026

(51) Int. Cl.
*G06F 40/279* (2020.01)

(52) U.S. Cl.
CPC .................................. *G06F 40/279* (2020.01)

(58) Field of Classification Search
CPC ..................................................... G06F 40/279
See application file for complete search history.

(56) References Cited

U.S. PATENT DOCUMENTS

| | | | | |
|---|---|---|---|---|
| 12,615,292 | B2 * | 4/2026 | Roytman | H04L 63/1483 |
| 2009/0150365 | A1 * | 6/2009 | Chow | G06F 16/953 |
| 2024/0070261 | A1 * | 2/2024 | Bin Huraib | G06F 21/566 |
| 2024/0160902 | A1 * | 5/2024 | Padgett | G06N 3/0895 |
| 2024/0378380 | A1 * | 11/2024 | Cheng | G06F 40/20 |
| 2025/0023913 | A1 * | 1/2025 | Roytman | H04L 41/16 |
| 2025/0061195 | A1 * | 2/2025 | Salman | G06F 21/554 |
| 2025/0071129 | A1 * | 2/2025 | Sinks | H04L 63/1416 |
| 2025/0124236 | A1 * | 4/2025 | Gupta | G06F 40/103 |
| 2025/0131126 | A1 * | 4/2025 | Gnanasekaran | G06F 21/6254 |
| 2025/0307318 | A1 * | 10/2025 | Wang | G06F 16/90332 |

OTHER PUBLICATIONS

Zellers, R., Holtzman, A., Rashkin, H., Bisk, Y., Farhadi, A., Roesner, F., & Choi, Y. (2019). Defending against neural fake news. Advances in neural information processing systems, 32. (Year: 2019).*

Greco, F., Desolda, G., Esposito, A., & Carelli, A. (2024). David versus goliath: can machine learning detect LLM-generated text. A Case Study in the Detection of Phishing Emails, ITASEC. (Year: 2024).*

* cited by examiner

*Primary Examiner* — Philip H Lam
(74) *Attorney, Agent, or Firm* — Gilliam IP PLLC

(57) ABSTRACT

A pipeline for classifying malicious communications as AI generated or human generated has been created. The pipeline uses a first prompt template that directs a first LLM to parse a phishing e-mail and extract information from the phishing e-mail. The pipeline searches publicly available information to obtain current information based on keywords in the information extracted from the phishing e-mail. The pipeline then uses a second LLM to compose an e-mail. With a different prompt template, the pipeline directs the second LLM to compose an e-mail based on the obtained, current information and a recipient and sender extracted from the phishing e-mail. With another prompt, the pipeline directs the second LLM to determine whether the phishing e-mail is similar to the LLM composed e-mail. If the second LLM responds that the phishing e-mail is similar to the composed e-mail, then the phishing e-mail is classified as AI generated.

20 Claims, 3 Drawing Sheets

ZERO SHOT DETECTION OF LLM GENERATED PHISHING EMAILS

BACKGROUND

The disclosure generally relates to data processing (e.g., CPC subclass G06F) and to computing arrangements based on specific computational models (e.g., CPC subclass G06N).

Rapid developments in artificial intelligence (AI) technologies have spawned numerous terms with fluid meanings. Recently, AI technologies are frequently referred to with the terms large language model (LLM), generative AI, and foundation model. Many of these technologies are based on or relate to the "Transformer" architecture.

A "Transformer" was introduced in VASWANI, et al. "Attention is all you need" presented in Proceedings of the 31st International Conference on Neural Information Processing Systems on December 2017, pages 6000-6010. The Transformer is a first sequence transduction model that relies on attention and eschews recurrent and convolutional layers. The Transformer architecture has been referred to as a "foundational model." The Center for Research on Foundation Models at the Stanford Institute for Human-Centered Artificial Intelligence used this term in an article "On the Opportunities and Risks of Foundation Models" to describe a model trained on broad data at scale that is adaptable to a wide range of downstream tasks. There has been subsequent research in similar Transformer-based sequence modeling. The architecture of a Transformer model typically is a neural network with transformer blocks/layers, which include self-attention layers, feed-forward layers, and normalization layers. The Transformer model learns context and meaning by tracking relationships in sequential data.

Some LLMs are based on the Transformer architecture. An LLM is "large" because the training parameters are typically in the billions and have been approaching a trillion parameters. AI technologies are not limited to LLMs and research and utilization of "lightweight" language models (i.e., fewer parameters than large) has grown. Language models can be pre-trained to perform general-purpose tasks or tailored to perform specific tasks. Tailoring of language models can be achieved through various techniques, such as prompt engineering and fine-tuning. In addition, zero-shot prompting and few-shot prompting can provide context or context and examples to guide a LLM.

The first instances of generative models can be found in research of the 1960s and 1970s which used generative models and statistical models to generate new instances of data. Advancements in neural networks and deep learning increased the capabilities of generative AI. The introduction of generative adversarial networks (GAN), considered a foundation model, created media that was arguably original. The introduction and advancements of the Transformer architecture yielded the Generative Pre-Trained Transformer (GPT) often associated with current generative AI technology.

The growth in generative AI has been accompanied by abuse and exploitation. Malicious actors have been misusing LLMs to create phishing e-mails that impersonate people, such as corporate executives and analysts.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Overview

A pipeline for classifying malicious communications as AI generated or human generated has been created. The pipeline captures social engineering elements in current, public information and can efficiently adapt to changing attack strategies with prompt tuning while still classifying with zero shot prompting. Using a phishing e-mail as an example of a malicious communication, the pipeline uses a first prompt template that directs a first LLM to parse the phishing e-mail and extract information from the phishing e-mail. The pipeline searches publicly available information to obtain current information based on keywords in the information extracted from the phishing e-mail. The pipeline then uses a second LLM to compose an e-mail. With a different prompt template, the pipeline directs the second LLM to compose an e-mail based on the obtained, current information and a recipient and sender extracted from the phishing-email. With another prompt, the pipeline directs the second LLM to determine whether the phishing e-mail is similar to the LLM composed e-mail. If the second LLM responds that the phishing e-mail is similar to the composed e-mail, then the phishing e-mail is classified as AI generated. The knowledge of whether malicious communication is AI generated informs security posture management. For instance, this knowledge can be an indicator of a malicious campaign and allow proactive measures or increase detection intelligence.

Example Illustrations

Figure 1:
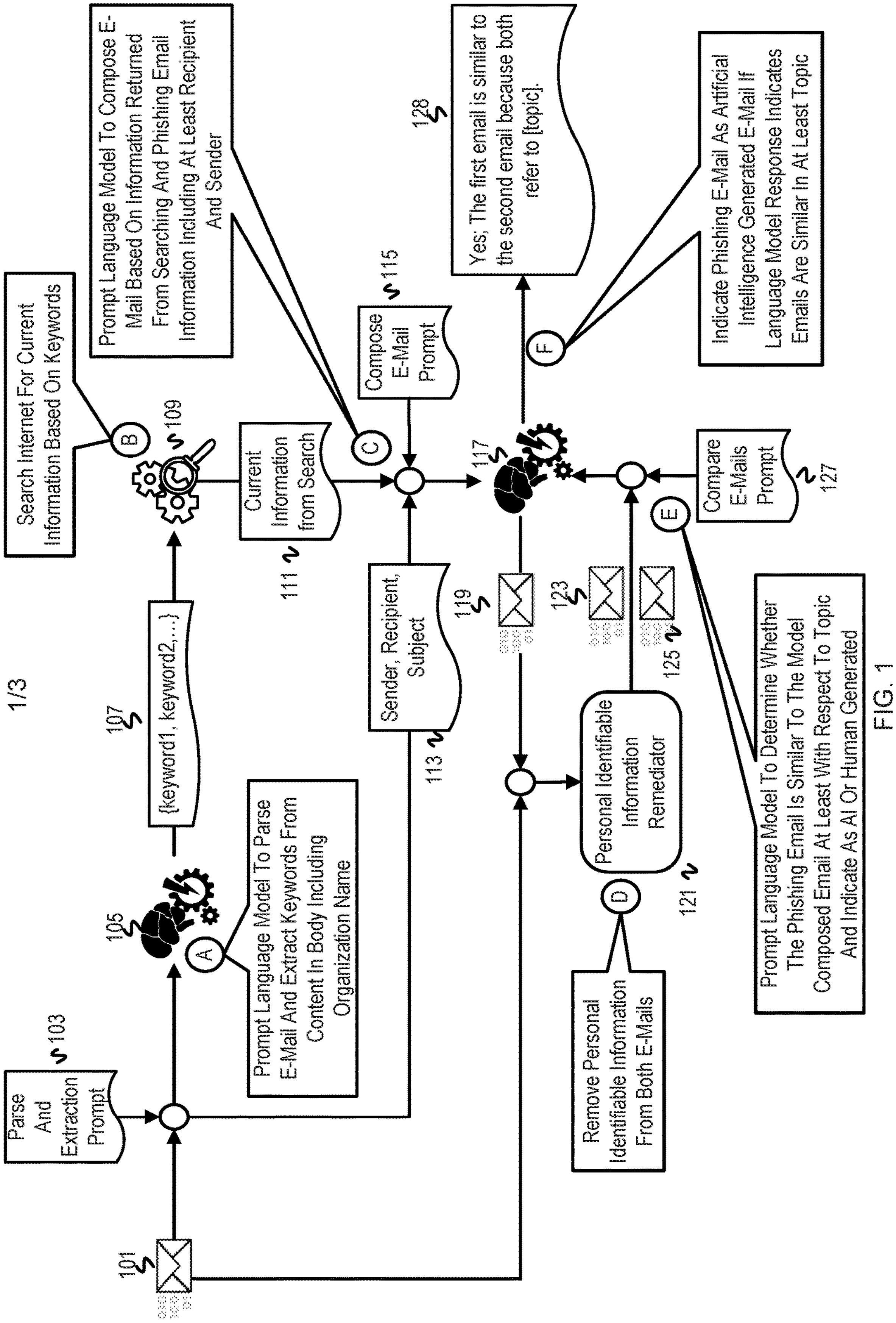
FIG. 1 is a conceptual diagram of a pipeline employing AI to classify a phishing e-mail as human generated or AI generated.

FIG. 1 is a conceptual diagram of a pipeline employing AI to classify a phishing e-mail as human generated or AI generated. The pipeline uses at least two different language model instances to avoid one biasing the other, for example because of conversation history or contextual information of different tasks influencing the other. The pipeline uses language models for parsing and keyword extraction, composing a communication for comparison, and classifying a communication as AI generated or not AI generated based on communication similarity. The pipeline also uses a searching/crawling tool 109 that retrieves current information and structures the information and uses a personal identifiable information (PII) remediator 121 to remove PII from e-mails.

FIG. 1 is annotated with a series of letters A-F indicating stages, each of which represents one or more operations. Although these stages are ordered for this example, the stages illustrate one example to aid in understanding this disclosure and should not be used to limit the claims. Subject matter falling within the scope of the claims can vary from what is illustrated.

At stage A, the pipeline prompts a language model 105 to parse a phishing e-mail 101 and extract keywords from content in the body of the phishing e-mail 101. The pipeline receives or obtains the phishing e-mail 101 after determination that it is a phishing attempt. For instance, a firewall or endpoint detection and response (EDR) system may have detected the phishing e-mail 101. The pipeline creates a prompt with the phishing e-mail 101 and a template, identified in FIG. 1 as a parse and extraction prompt 103. The parse and extraction prompt 103 includes a task instruction directing a language model to parse an e-mail into its components—e.g., header, subject line, body, and signature block. The parse and extraction prompt 103 also includes a task instruction directing a language model to extract keywords from content in the body of the e-mail, a recipient from the header, and a sender from the header. The task instructions in the parse and extraction prompt 103 can specify keywords to extract, such as an organization name.

At stage B, the pipeline uses the searching tool 109 to search the Internet for current information based on keywords 107 extracted from the body content of the e-mail 101. This can be a tool that uses the keywords to search the Internet with various search engines and creates structured information from the search results. For example, the pipeline may have a configuration file that specifies which search engines the tool 109 will use and a limit on results. The tool 109 can then create a JavaScript® object notation (JSON) object that structures the search results or a hypertext markup language document that structures the search results. This information is identified in FIG. 1 as the current information 111 from search.

At stage C, the pipeline prompts a language model 117 to compose an e-mail based on the information returned from the searching tool 109 and information extracted from the phishing email 101, at least including recipient and sender. The language model 105 extracted the sender and recipient from the e-mail 101 in response to the prompting in stage A. Information from the signature block and the subject line may have also been extracted. In this illustration, extracted information 113 from the phishing e-mail 101 includes sender, recipient, and subject. The pipeline forms a prompt with the extracted information 113, the structured current information 111, and a template referred to as compose e-mail prompt 115 in FIG. 1. The compose e-mail prompt 115 includes task instructions directing a language model to compose an e-mail based on the contextual information to be associated with the task instructions, which in this case are the extracted information 113 and the current information 111. The pipeline submits the formed prompt to the language model 117. In response, the language model 117 generates composed e-mail 119.

At stage D, the pipeline removes PII from both e-mails—the phishing e-mail 101 and the composed e-mail 119. FIG. 1 depicts the PII remediator 121 as removing the PII from the e-mails 101, 119. Various tools are available for scanning an object (e.g., file, e-mail, document, etc.) to detect PII and remove PII. However, embodiments can also prompt a language model to remove PII from the e-mails 101, 119. For instance, the pipeline can also prompt the language model 117 to remove the PII from the e-mails 101, 119. Removal of the PII from the phishing e-mail 101 and the composed e-mail 119 yields remediated e-mails 123, 125, respectively.

At stage E, the pipeline prompts the language model 117 to determine whether the remediated phishing e-mail 123 is similar to the remediated, model composed e-mail 125, at least with respect to topic. The pipeline creates a prompt with a template, referred to in FIG. 1 as compare e-mails prompt 127, and the remediated e-mails 123, 125. The compare e-mails prompt 127 includes task instructions directing a language model to determine whether e-mails are similar based on topic of the e-mails and based on the determination of similarity and indicate whether the e-mail of interest, in this case the e-mail 101, was AI or human generated. The compare e-mails prompt 127 can include task instructions for a higher quality response from the language model, such as directing the language model to disregard style and the explain why the e-mails are considered similar. The pipeline submits the prompt formed with the compare e-mails prompt 127 and the remediated e-mails 123, 125, and obtains a response 128.

At stage F, the LLM 117 generates a response that indicates the phishing email 101 as an AI generated e-mail or a human generated e-mail depending upon the determination of similarity by the LLM 117. In this illustration, the response 128 states, "Yes; The first email is similar to second email because both refer to [topic]." Structure of the response 128 is based on the compare e-mails prompt 127 including a task instruction for the LLM 117 to output its response as a tuple including 1) a Yes or No that the e-mail of interest was AI generated based on determination of similarity and 2) an explanation for the response. The LLM 117 compares the e-mails 123, 125 to determine similarity, for example with respect to topic, and generates the response 128 accordingly. Similarity of a phishing e-mail with a language model composed e-mail is used as a condition for classifying an e-mail as AI generated or not AI generated. Similarity can be considered a high confidence indicator that the phishing e-mail was AI generated. Since the response 128 indicates that the topics of the e-mails 123, 125 are similar, the pipeline outputs an indicator of the classification extracted from the response 128, or alternative outputs the response 128. The classification can be added as security metadata for the phishing e-mail 101.

The description of FIG. 1 refers to a phishing e-mail as a concrete example to aid in understanding the disclosure. Embodiments are not limited to a phishing e-mail and can be used to classify other types of malicious e-mails as AI generated or human generated. Indeed, embodiments are not limited to e-mails. The disclosure can be applied to other types of malicious communications, such as instant messages or chats, to determine whether the malicious communications are AI generated or not AI generated.

Figure 2:
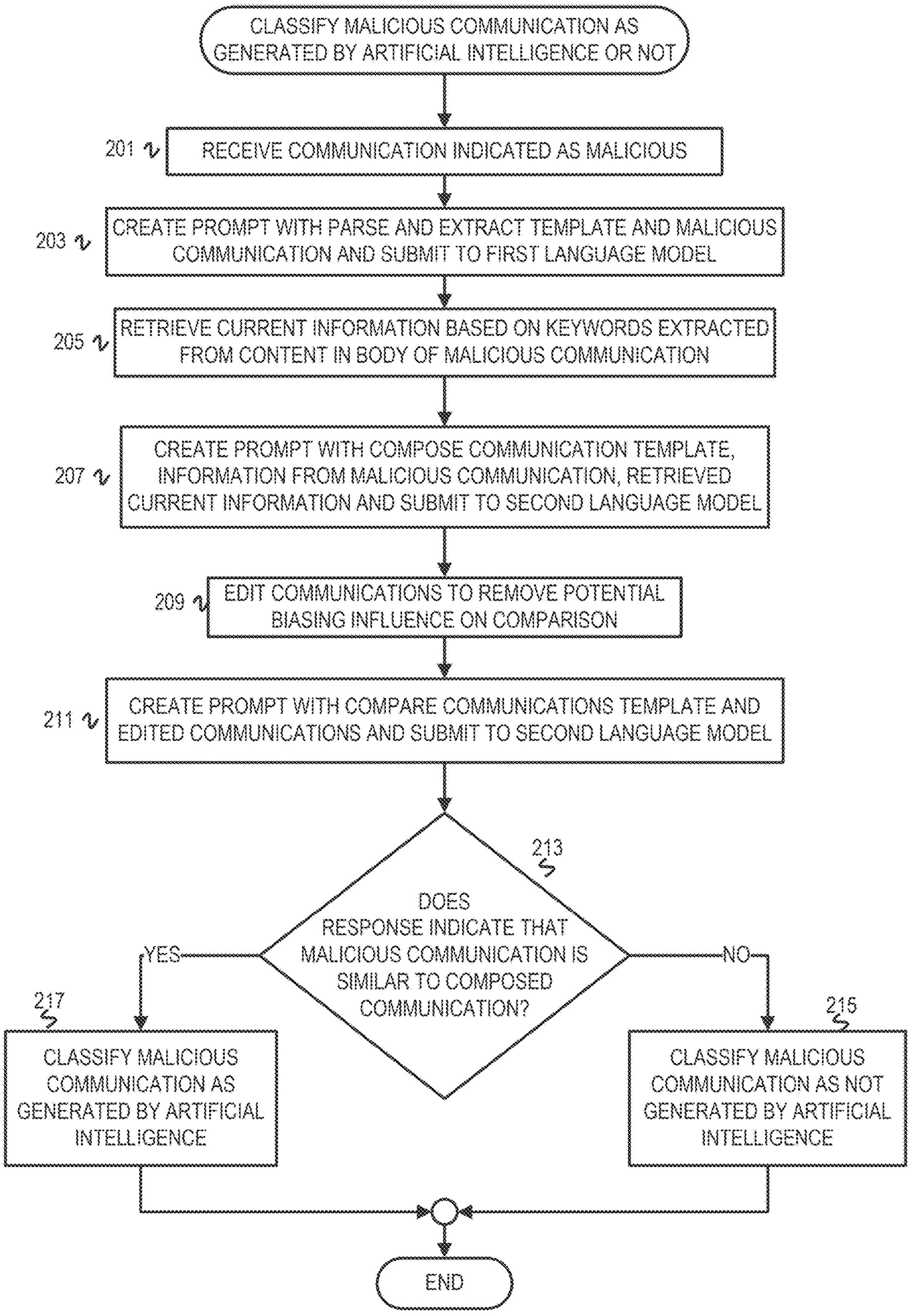
FIG. 2 is a flowchart of example operations for classifying a malicious communication as generated by AI or not generated by AI.

FIG. 2 is a flowchart of example operations for classifying a malicious communication as generated by AI or not generated by AI. FIG. 2 refers to a malicious communication instead of only a phishing e-mail. The example operations are described with reference to a malicious communication classifier pipeline for consistency with the FIG. 1 and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

At block 201, a malicious communication classifier pipeline receives a communication indicated as malicious. A security service or system can provide malicious communications to the malicious communication classifier pipeline for determination of whether it was AI or human generated. In some implementations, the malicious communication classifier pipeline retrieves malicious communications from a queue or repository to which the security service or security system stores detected malicious communications. In the case of a classifier pipeline handling heterogeneous communication types, the type can be represented in the style of the communication. A prompt can include a task instruction to determine style which can later be used to influence the composing of a comparative message. In another implementation, the communication type is indicated by the source of the communication (e.g., email program, instant messaging program, etc.).

At block 203, the malicious communication classifier pipeline creates a prompt with the malicious communication and a template that has parse and extract task instructions. The task instructions direct the first language model to parse the malicious communication into a particular structure, e.g., JSON dictionary. Assuming a key-based structure, the task instructions can specify the keys sender, receiver, organization name, and body content. The task instructions can also direct the first language model to extract the sender, recipient, recipient organization name, and keywords from the content in the communication body. The parsing task instructions can vary for communication type. For instance, the parsing task instructions may direct a language model to parse an e-mail into a header, subject line, body, and signature block, some of which would not be relevant to a text message or instant message. An example of parse and extract task instructions in a prompt template or prompt prefix (i.e., context and/or task instruction(s) to be added with another input (i.e., the malicious communication) is below.

"You are an assistant who processes communications. Performs the steps that follow and return the result as a JSON dictionary. The JSON dictionary should at least have keys for sender, receiver, subject, organization, and body content. Organization refers to the organization of the receiver.

1. Extract the sender, receiver, and subject from the communication.
2. Extract the organization of the receiver from the communication.
3. Extract content from the body of the communication and remove sender and receiver information from the content.
4. Take the result of step 3 and extract key information in a succinct format."

The malicious communication is concatenated with the prompt template/prefix. The malicious communication classifier pipeline submits the prompt to a first language model.

At block 205, the malicious communication classifier pipeline retrieves current information based on keywords extracted from content in the body of the malicious communication. An implementation can create a chain of agents to perform the series of operations from obtaining the keywords to obtaining the search results based on the keywords. For instance, the first language model can be prompted to extract meaningful keywords from the JSON dictionary provided at block 203. The prompt can have the simple task instructions of extracting meaningful keywords and then coupling that with the structured information provided from the first prompt. This prompt may also have additional context or task instructions to return an empty list if the information extracted in response to the first prompt corresponds to a generic malicious communication that indicates an invoice due or clickbait. If an empty list is returned, then the malicious communication classifier pipeline can generate an indication that the communication is too generic to be classified. If keywords are extracted, they can be passed as arguments or objects in an invocation of a searching tool, such as the SerpAPI tool. The searching tool will search publicly available information based on the extracted keywords. The searching tool then structures the search results.

At block 207, the malicious communication classifier pipeline creates a prompt with a compose communication template, information extracted from the malicious communication, and retrieved current information. The compose communication template includes task instructions for a language model to compose a communication of a same type as the malicious communication. The task instructions can include some constraints. For instance, some information extracted from the malicious communication, such as a subject, can be used in composing the subject but not the body content. Below are example task instructions for a compose communication prompt template.

"You compose communications to organizations and for organizations. Compose a communication with the sender, receiver, and content indicated in the subsequent listing of information. When composing the communication disregard information from the subject for content generation. Compose a specific and convincing communication that uses no more than 100 words."

The malicious communication classifier pipeline submits the created prompt to a second language model to avoid the data of the first language model influencing the second language model. The second language model will generate a composed communication responsive to the prompt.

At block 209, the malicious communication classifier pipeline edits the malicious communication and the composed communication to remove potential biasing influence on the comparison. As stated previously, the pipeline can invoke a tool or the second language model to remove PII from the communications.

At block 211, the malicious communication classifier pipeline creates a prompt with a compare communications template and the edited communications. The compare communications prompt template includes task instructions for a language model to determine whether communications are similar and to disregarding information that can bias that determination. Below is an example of the compare communications prompt template.

"You are an assistant that determines whether communications are similar. Determine whether the communication identified as communication 1 is similar to the communication identified as communication 2. Focus on topic and context of the content in the communications in making the determination. Ignore writing style that has urgency and all other parts of the communications outside of the body. Return your answer as a tuple of yes or no along with an explanation for the answer. If there is more than one explanation or reason for the answer, provide the top 3 reasons in order. If the communications are generic malicious communications, then answer no."

The malicious communication classifier pipeline submits the prompt to the second language model.

At block 213, the malicious communication classifier pipeline determines whether the response from the language model indicates that the malicious communication is similar to the composed communication. An answer of "yes" for similarity is treated as a "yes, the e-mail was AI generated." Likewise, an answer of "no" for similarity is treated as a "no, the e-mail was not AI generated." If the response indicates "yes" the communications are similar, then operational flow proceeds to block 217. If the response indicates the communications are not similar, then operational flow proceeds to block 215.

At block 217, the malicious communication classifier pipeline classifies the malicious communication as generated by AI. This can be generating a notification, adding the classification as metadata to the malicious communication, and/or updating a user interface in which the malicious communication is presented.

At block 215, the malicious communication classifier pipeline classifies the malicious communication as not generated by AI. Implementations can handle the classification of a malicious communication as not AI generated or as human generated in the same manner as the examples given for the AI generated classification of a malicious communication. In some cases, the not AI generated classification is not consumed elsewhere.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 3:
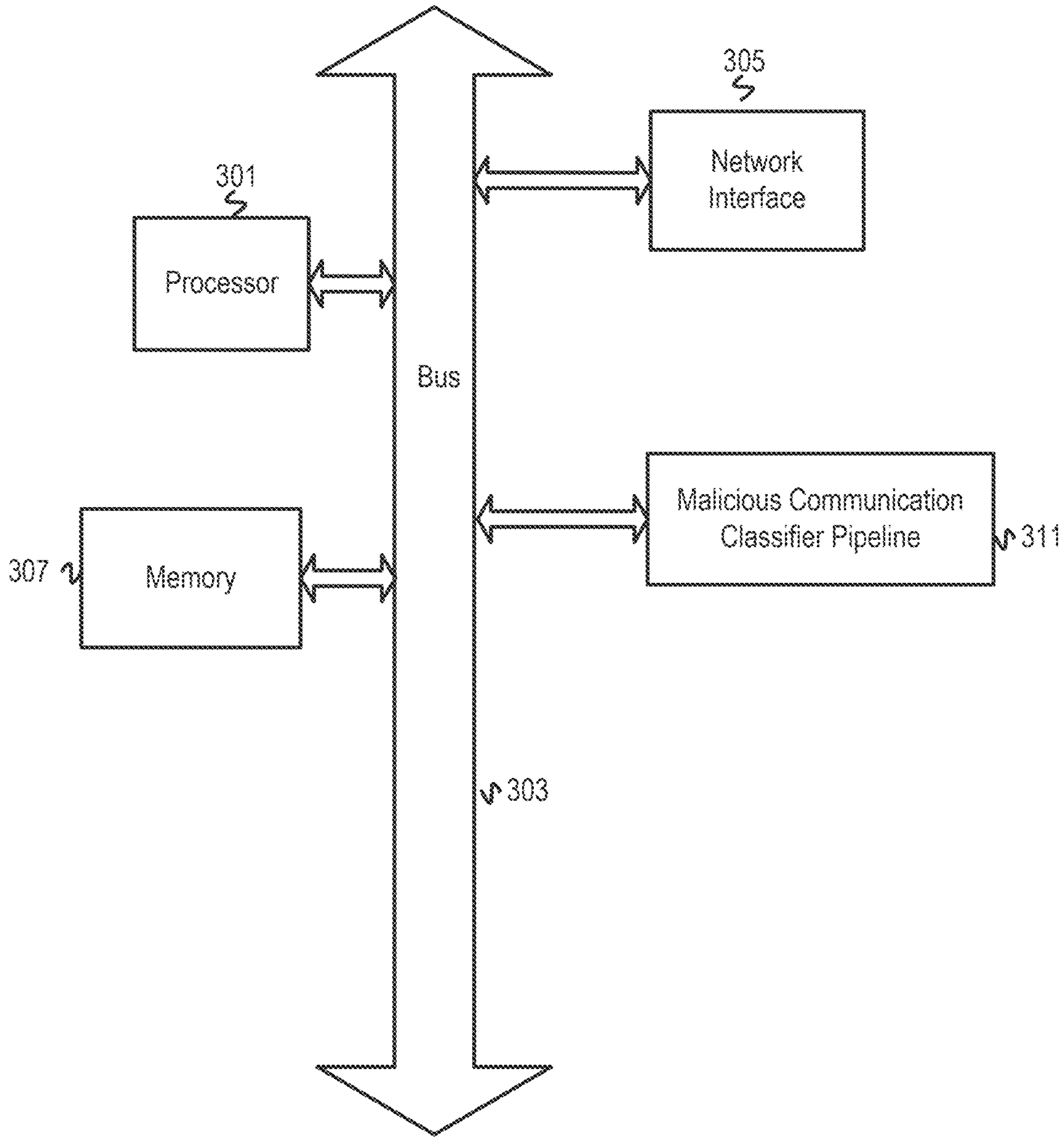
FIG. 3 depicts an example computer system with a malicious communication classifier pipeline.

FIG. 3 depicts an example computer system with a malicious communication classifier pipeline. The computer system includes a processor 301 (possibly including multiple processors, multiple cores, multiple nodes, and/or implementing multi-threading, etc.). The computer system includes memory 307. The memory 307 may be system memory or any one or more of the above already described possible realizations of machine-readable media. The computer system also includes a bus 303 and a network interface 305. The system also includes malicious communication classifier pipeline 311. The malicious communication classifier pipeline 311 can be implemented to include foundation models, but more likely submits requests (e.g., via application programming interfaces (APIs) to applications or services that provide access to the foundation models. The malicious communication classifier pipeline 311 extracts information from a communication that has already been detected as a malicious communication. Some of the extracted information, such as receiver and sender, are used to provide context and direction to a foundation model to compose a communication to be used as a reference communication. The other extracted information, such as keywords from a body of the malicious communication, is extracted to guide retrieval of current information. The malicious communication classifier pipeline 311 uses different foundation models or model instances for the information extraction and the communication composition to avoid influence or bias between the different tasks. After retrieving the current information, the malicious communication classifier pipeline 311 prompts the second foundation model to compose the communication based on the extracted information. The malicious communication classifier pipeline 311 may include constraints or context that further guides the second foundation model to focus on content extracted from the malicious communication when composing the reference communication. The malicious communication classifier pipeline 311 then instructs the second foundation model to compare the communications to determine whether they are similar. Similarity is used as an indicator that the malicious communication is AI generated. The malicious communication classifier pipeline 311 removes PII from the communications as the PII can reduce the effectiveness of the comparison by the second foundation model in determining whether the communications are similar. In addition, the prompt to the second foundation model to compare the communications and determine similarity can include task instructions to disregard style. Any one of the previously described functionalities may be partially (or entirely) implemented in hardware and/or on the processor 301. For example, the functionality may be implemented with an application specific integrated circuit, in logic implemented in the processor 301, in a co-processor on a peripheral device or card, etc. Further, realizations may include fewer or additional components not illustrated in FIG. 3 (e.g., video cards, audio cards, additional network interfaces, peripheral devices, etc.). The processor 301 and the network interface 305 are coupled to the bus 303. Although illustrated as being coupled to the bus 303, the memory 307 may be coupled to the processor 301.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The term "extract" is used to refer to copying a value from a source and re-using that value or writing that copied value into a destination. Extracting a value in this description does not mean removing the value from the source.

The invention claimed is:

1. A method comprising:

prompting a first language model to extract from a first electronic communication a header and keywords from a body of the first electronic communication, wherein the first electronic communication has already been determined to be an attack;

searching publicly available information based on the keywords;

prompting a second language model to compose a second electronic communication based, at least in part, on information acquired from the searching and a sender and a recipient indicated in the header;

prompting the second language model to determine whether the first and second electronic communications are similar; and indicating the first electronic communication as generated by artificial intelligence (AI) if the second language model responds that the first and second electronic communications are similar, wherein indicating the first electronic communication as AI generated comprises at least one of updating metadata of the first electronic communication to indicate that the first electronic communication is AI generated and indicating to security posture management that the first electronic communication is AI generated.

2. The method of claim 1, wherein prompting the second language model to determine whether the first and second electronic communications are similar is according to zero shot prompting.

3. The method of claim 1 further comprising removing personally identifiable information from the first and second electronic communications before prompting the second language model to determine whether the first and second electronic communications are similar.

4. The method of claim 1, wherein searching publicly available information comprises prompting the first language model or a third language model to search publicly available information based on the keywords.

5. The method of claim 1, wherein prompting the first language model comprises:

generating a first prompt with one or more task instructions to extract a sender and a recipient from the first electronic communication, to extract the body from the first electronic communication, to remove indications of the sender and the recipient from the extracted body and identify keywords in the extracted body after removal of the indications of the sender and the recipient; and submitting the first prompt to the first language model.

6. The method of claim 1, wherein prompting the second language model to determine whether the first and second electronic communications are similar comprises:

generating a first prompt with a set of one or more task instructions to determine similarity based on topic of content in the bodies of the first and second electronic communications and to disregard recipient and sender; and submit the first prompt to the second language model.

7. The method of claim 6, wherein generating the first prompt with the set of one or more task instructions to determine similarity comprises generating the first prompt with the set of one or more task instructions to also disregard style of the first and second electronic communications and parts of the first and second electronic communications that are not the bodies.

8. A non-transitory, machine-readable medium having program code stored thereon, the program code comprising instructions to:

classify a malicious communication as artificial intelligence (AI) generated or not AI generated, wherein the instructions to classify the malicious communication comprise instructions to, prompt a first language model to extract keywords from a body of the malicious communication;

retrieve current publicly available information based on the keywords;

prompt a second language model to compose a communication based, at least in part, on the retrieved information and a sender and a recipient indicated in the malicious communication;

prompt the second language model to determine whether the malicious communication is similar to the composed communication based, at least in part, on content of the malicious and composed communications; and wherein the instructions to classify the malicious communication comprise the instructions to classify the malicious communication as AI generated if the second language model responds that the malicious communication is similar to the composed communication; and based on a classification of the malicious communication as AI generated, at least one of update metadata of the malicious communication with the classification and indicate the classification and the malicious communication to security posture management.

9. The non-transitory, machine-readable medium of claim 8, wherein the instructions to prompt the second language model to determine whether the malicious communication is similar to the composed communication comprise instructions to generate a zero-shot prompt for the second language model to determine similarity.

10. The non-transitory, machine-readable medium of claim 8, wherein the program code further comprises instructions to remove personally identifiable information from the malicious and composed communications before the similarity determination.

11. The non-transitory, machine-readable medium of claim 8, wherein the instructions to prompt the second language model to determine whether the malicious communication is similar to the composed communication comprise instructions to generate a prompt with a set of one or more task instructions to remove personally identifiable information from the malicious and composed communications and then to determine whether the malicious communication is similar to the composed communication.

12. The non-transitory, machine-readable medium of claim 8, wherein the instructions to retrieve current publicly available information based on the keywords comprise instructions to invoke a crawler or instruct a model to search publicly available information for current information based on the keywords.

13. The non-transitory, machine-readable medium of claim 8, wherein the instructions to prompt the first language model comprise instructions to:

generate a first prompt with one or more task instructions to extract a sender and a recipient from the malicious communication, to extract content from the body of the malicious communication, to remove indications of the sender and the recipient from the extracted content, and to identify keywords in the extracted content after removal of the indications of the sender and the recipient; and submit the first prompt to the first language model.

14. The non-transitory, machine-readable medium of claim 8, wherein the instructions to prompt the second language model to determine whether the malicious communication is similar to the composed communication comprise instructions to:

generate a first prompt with a set of one or more task instructions to determine similarity based on topic of the content of the malicious and composed communications and disregard recipient and sender; and submit the first prompt to the second language model.

15. The non-transitory, machine-readable medium of claim 14, wherein the instructions to generate the first prompt with the set of one or more task instructions to determine similarity comprise the instructions to generate the first prompt with the set of one or more task instructions to also disregard style of the malicious and composed communications and parts of the malicious and composed communications that are not the bodies.

16. An apparatus comprising:

a processor;

a machine-readable medium having instructions stored thereon, the instructions executable by the processor to cause the apparatus to:

classify a malicious communication as artificial intelligence (AI) generated or not AI generated, wherein the instructions to classify the malicious communication comprise instructions to, prompt a first language model to extract keywords from a body of the malicious communication;

retrieve current publicly available information based on the keywords;

prompt a second language model to compose a communication based, at least in part, on the retrieved information and a sender and a recipient indicated in the malicious communication;

prompt the second language model to determine whether the malicious communication is similar to the composed communication based, at least in part, on content of the malicious and composed communications; and classify the malicious communication as AI generated if the second language model responds that the malicious communication is similar to the composed communication; and based on a classification of the malicious communication as AI generated, at least one of update metadata of the malicious communication with the classification and indicate the classification and the malicious communication to security posture management.

17. The apparatus of claim 16, wherein the machine-readable medium further has stored thereon instructions executable by the processor to cause the apparatus to remove personally identifiable information from the malicious and composed communications before the similarity determination.

18. The apparatus of claim 16, wherein the instructions to prompt the second language model to determine whether the malicious communication is similar to the composed communication comprise instructions executable by the processor to cause the apparatus to generate a prompt with a set of one or more task instructions to remove personally identifiable information from the malicious and composed communications and then determine whether the malicious communication is similar to the composed communication.

19. The apparatus of claim 16, wherein the instructions to prompt the first language model comprise instructions executable by the processor to cause the apparatus to:

generate a first prompt with one or more task instructions to extract a sender and a recipient from the malicious communication, to extract content from the body of the malicious communication, to remove indications of the sender and the recipient from the extracted content, and to identify keywords in the extracted content after removal of the indications of the sender and the recipient; and submit the first prompt to the first language model.

20. The apparatus of claim 16, wherein the instructions to prompt the second language model to determine whether the malicious communication is similar to the composed communication comprise instructions executable by the processor to cause the apparatus to:

generate a first prompt with a set of one or more task instructions to determine similarity based on topic of the content of the malicious and composed communications and disregard recipient and sender; and submit the first prompt to the second language model.

* * * * *